(12) United States Patent
Kappes et al.

(10) Patent No.: US 10,305,986 B2
(45) Date of Patent: *May 28, 2019

(54) PEER-TO-PEER SHARING OF CLOUD-BASED CONTENT

(71) Applicant: Microsoft Technology Licensing LLC, Redmond, WA (US)

(72) Inventors: Daniel Kappes, Redmond, WA (US); Jian Lin, Sammamish, WA (US); Igor Liokumovich, Sammamish, WA (US); Hemant Nanivadekar, Bellevue, WA (US); Mandar Gokhale, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/804,419

(22) Filed: Jul. 21, 2015

(65) Prior Publication Data

US 2015/0326667 A1 Nov. 12, 2015

Related U.S. Application Data

(63) Continuation of application No. 13/717,727, filed on Dec. 18, 2012, now Pat. No. 9,143,568.

(51) Int. Cl.
*G06F 15/16* (2006.01)
*H04L 29/08* (2006.01)

(52) U.S. Cl.
CPC ........ *H04L 67/1097* (2013.01); *H04L 67/104* (2013.01); *H04L 67/1074* (2013.01)

(58) Field of Classification Search
USPC ........ 709/217, 223, 225, 226, 227, 202, 218
See application file for complete search history.

(56) References Cited

U.S. PATENT DOCUMENTS

| | | | |
|---|---|---|---|
| 7,809,888 B1 * | 10/2010 | Clark | G06F 12/0871 711/118 |
| 7,912,948 B2 | 3/2011 | Gkantsidis et al. | |
| 8,090,861 B2 | 1/2012 | Miller et al. | |
| 8,180,853 B2 | 6/2012 | Lee et al. | |

(Continued)

OTHER PUBLICATIONS

"Peer Caching", Retrieved at <<http://msdn.microsoft.com/en-us/library/windows/desktop/aa964314(v=vs.85).aspx>>, Oct. 19, 2012, pp. 1.

(Continued)

*Primary Examiner* — Liang Che A Wang

(57) ABSTRACT

A cloud-based storage service hosts content information that may be accessed by client machines in a peer-to-peer network. The content information is a compact representation of the content which is stored outside of the cloud-based storage service. The cloud-based storage service generates the content information and a content information hash. The content information hash is used to validate the content information when the content information is downloaded to the peer-to-peer network. The cloud-based storage service also generates metadata that describes the content information so that a client machine in the peer-to-peer network may access the content information from the cloud-based storage service.

20 Claims, 8 Drawing Sheets

(56) References Cited

U.S. PATENT DOCUMENTS

| | | | |
|---|---|---|---|
| 2002/0049760 A1* | 4/2002 | Scott | G06F 17/30067 |
| 2008/0256615 A1* | 10/2008 | Schlacht | H04N 7/162 |
| | | | 726/9 |
| 2008/0281950 A1 | 11/2008 | Wald et al. | |
| 2009/0265473 A1 | 10/2009 | Hydrie et al. | |
| 2010/0146231 A1* | 6/2010 | Gopalan | G06F 11/1458 |
| | | | 711/162 |
| 2012/0239825 A1* | 9/2012 | Xia | G06F 9/44505 |
| | | | 709/250 |
| 2013/0191914 A1* | 7/2013 | Dubrovsky | H04L 63/0245 |
| | | | 726/22 |
| 2014/0075183 A1* | 3/2014 | Wang | G06F 19/22 |
| | | | 713/150 |
| 2014/0156866 A1* | 6/2014 | Kallstrom | H04L 67/06 |
| | | | 709/232 |

OTHER PUBLICATIONS

Binns, Jessica, "Polkast Adds Peer-to-Peer Convenience to File-sharing in the Cloud", Retrieved at <<http://mobileenterprise.edgl.com/products/Polkast-Adds-Peer-to-Peer-Convenience-to-File-sharing-in-the-Cloud80427>>, May 31, 2012, pp. 3.

Roettgers, Janko, "BitTorrent takes on Dropbox with personal file sharing", Retrieved at <<http://gigaom.com/2012/01/05/bittorrent-share-app/>>, Jan. 5, 2012, pp. 16.

* cited by examiner

PEER-TO-PEER SHARING OF CLOUD-BASED CONTENT

CROSS-REFERENCE TO RELATED APPLICATIONS

This application is a continuation of Ser. No. 13/717,727, filed on Dec. 18, 2012, entitled "PEER-TO-PEER SHARING OF CLOUD-BASED CONTENT", the entirety of which is incorporated herein by reference.

BACKGROUND

A peer-to-peer network allows users with computing devices within the network to share resources. Peer-to-peer networks are configured to facilitate real-time communication and collaboration across distributed networks. Each computing device in a peer-to-peer network executes using the same network protocols and software in order to communicate. A computing device participates by providing access to some of its resources. For example, a computing device may reserve a portion of its storage for files that are shared. Other nodes in the peer-to-peer network may access these files using the network protocols and software common to all nodes in the peer-to-peer network.

A cloud-based storage service provides data storage at a remote site accessible through a web-based interface. A cloud-based storage service provides virtually unlimited storage for a user without the user needing to obtain and maintain the physical storage devices. Since real-time access to the content is often through a web-based application, the content may be accessed any time from anywhere. However, cloud-based storage services and peer-to-peer protocols have been developed independently resulting in some peer-to-peer protocols not configured to communicate with some cloud-based storage services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A cloud-based storage service stores content or content files that may be shared within a peer-to-peer network as content information. The content information is a set of hashes with each hash representing a portion of the content. The content information is a compact representation of the content which is faster to download than the content in its original format.

The cloud-based storage service may include a content metadata service, a content queue, a content information service, and a content information storage service. The content metadata service may receive a request from a publisher to make the content accessible from the cloud-based storage service. The request is placed in a content queue to initiate generation of the content information. The content information service processes the request by retrieving the content and generating the content information and content information hash. The content information and content information hash are stored in the content information storage service. The content metadata service generates metadata that may be used by a client machine to retrieve the content information, at a later time, from the content storage service.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
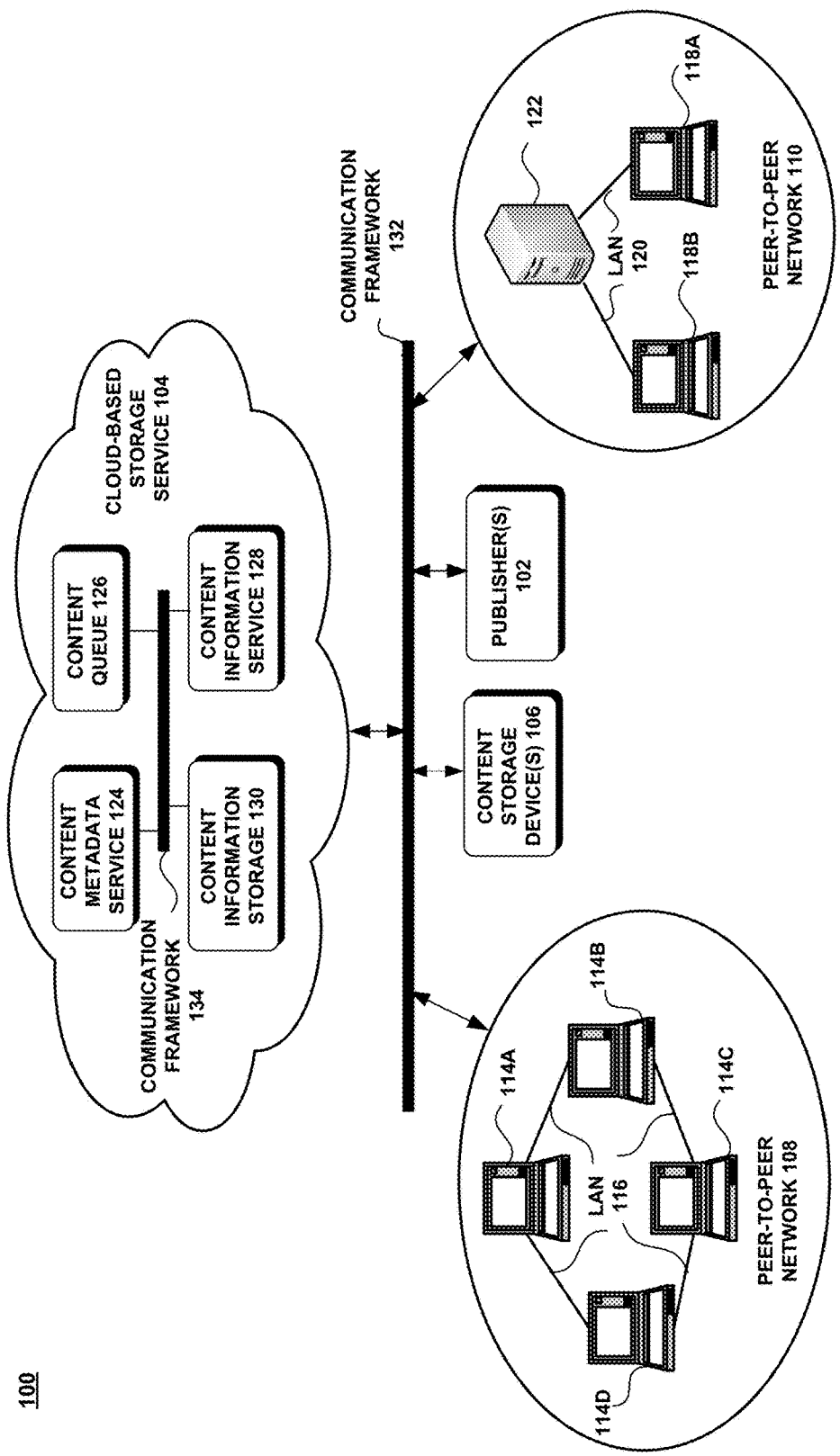
FIG. 1 is a block diagram illustrating an exemplary system having several peer-to-peer networks coupled to a cloud-based storage service.

Various embodiments pertain to a cloud-based storage service that hosts content that may be shared within a peer-to-peer network. The content that is shared within a peer-to-peer network may be accessed from a cloud-based storage service. The cloud-based storage service provides a peer-to-peer network with the additional capability of sharing content from a web-based storage facility. A version of the content is stored in the cloud-based storage service as a set of hashes, referred to as content information. The content information is a compacted version of the content that may be downloaded from the cloud-based storage service faster than downloading the original content.

The content information service also generates a set of hashes for the content information, referred to as content information hash. The content information hash is used to validate the content information when the content information is retrieved by a client machine within the peer-to-peer network. In this manner, the integrity of the content information is preserved from tampering when downloaded.

The cloud-based storage service generates the content information and the content information hash and stores them in the cloud-based storage service. The original format of the content remains in a content storage device that is separate from the cloud-based storage service. The use of two distinct devices in this manner alleviates a single point of compromise.

In order to associate the content with the cloud-based storage service, the cloud-based storage service uses a content metadata service to initiate the association of the content within the cloud-based storage service. The content metadata service initiates generation of the content information when requested by a publisher of the content. In addition, the content metadata service generates and stores metadata that describes the content information. The metadata may be provided to a client machine in a peer-to-peer network so that the client machine may access the content information from the cloud-based storage service. The metadata may include the location of the content in the cloud-based storage service, the content hashes (i.e., hashes that validate the content), the location of the content information in the cloud-based storage service, and the content information hash.

A client machine may use the location of the content information in the metadata to retrieve the content information from the cloud-based storage service. The content information is validated using the content information hash. Once the content information is validated, the content information is used to search for the content in the peer-to-peer network. If the content is found in the peer-to-peer network, the client machine obtains the local copy of the content from the peer-to-peer network. When the content is not found in the peer-to-peer network, the client machine may use the location of the content in the metadata to retrieve the content from its original storage location. When only a portion of the content is found in the peer-to-peer network, the peer-to-peer network may obtain the missing portions from its original storage location.

Attention now turns to a discussion of a system 100 that utilizes a cloud-based storage service with a peer-to-peer network computing environment. Although the system 100 as shown in FIG. 1 has a limited number of elements in a certain topology, it may be appreciated that the system 100 may include more or less elements in alternate topologies as desired for a given implementation.

The system 100 may include one or more publishers 102, a cloud-based storage service 104, one or more content storage devices 106, and one or more peer-to-peer networks 108, 110. Each component of the system may be communicatively coupled to other components through a communication framework 132, such as the Internet.

A publisher 102 may store content in various content storage devices 106. A content storage device 106 may be a computing device, such as a file server, network attached storage device, network storage devices, server, and so forth. The content storage device 106 contains content that may be shared within a peer-to-peer network. The content may be any type of digital file containing any type of data, such as without limitation, audio, video, text, web pages, photos, database schemas, program code, encrypted data, web links, and so forth.

A peer-to-peer network is configured to share resources within each node or computing device within the peer-to-peer network. In one or more embodiments, each peer-to-peer network may be located at a branch office (e.g., location of an organization, business, or entity). Each local office may contain a local copy of the content which may be shared with other computing devices within the peer-to-peer network.

A peer-to-peer network may be configured to work in a hosted mode or in a distributed mode. In hosted or hybrid mode, one client machine is configured to be a local content server that stores and distributes a local copy of the content. The local content server distributes content to other client machines within the peer-to-peer network. Peer-to-peer network 110 is configured in hosted mode with a select client machine configured as the local content server 122. Computing devices 118A-118B (collectively, "118") obtain shared content from the local content server 122. Initially, a client machine requests content from the local server 122. The local server 122 distributes the local copy of the content to the other client machines when requested.

In a peer-to-peer network configured in distributed mode, each client machine stores the content and shares the content with other client machines within the network. Referring to FIG. 1, peer-to-peer network 108 is configured in distributed mode. Each client machine 114A-114D (collectively, "114") is connected to other client machines 114 through a local area network (LAN) 116. Each client machine within the network 108 may contain a local copy of the content. Each client machine reserves a portion of its physical storage and other resources to share with other client machines 114. When a client machine 114 needs content, a request may be broadcast on the LAN 116 to the other client machines 114. The client machine 114 storing the content provides the content to the requesting client machine.

In one or more embodiments, the peer-to-peer networks 102, 110 may utilize the BranchCache® distribution application. BranchCache® is a set of software applications that manages the distribution of content stored in Web servers and file servers to peer-to-peer networks. The technology described herein extends the capability of BranchCache® to access content from a cloud-based storage service.

The distribution of the content within a peer-to-peer network is performed securely through a set of hashes referred to as content information. A hash function takes a block of data and returns a fixed-size bit string referred to as a hash value or hash. In several embodiments, a cryptographic hash function may be used to generate the hash. A cryptographic hash function is advantageous for generating a different hash value when there is a change in the data. The use of a hash function to represent the content generates a compacted form of the content that takes less storage space and which takes less transmission time to download. In essence, the content information is a compacted form of the content.

In one or more embodiments, a Secure Hash Algorithm (SHA) may be used as the cryptographic hash function that generates the content information, the content information hash and the content hash. There are four generations of SHAs and they are commonly referred to as SHA-0, SHA-1, SHA-2, and SHA-3. SHA-0 is the original algorithm. SHA-1 corrects an error in SHA-0. SHA-2 is a different algorithm than SHA-0 and consists of a set of four cryptographic hash functions: SHA-224; SHA-256; SHA-384; and SHA-512. Each of the cryptographic hash functions in SHA-2 is distinguished by the length of the bits in its corresponding digest (i.e., 224, 256, 384, 512).

Content is divided into segments and the segments are divided into blocks. The segment size and the block size are configurable parameters. A block hash is computed for each block and a segment hash is computed for each segment. A cryptographic hash function, such as SHA-1 or SHA-2, may be used to generate the block and segment hashes. The hashes are then used to identify and verify each block and segment of the content.

The content information consists of the segment hashes and the block hashes. The content information is then used to locate the content in a peer-to-peer network. The content information is then used to authenticate and rebuild the content, from the content information, on the client machine.

The cloud-based storage service 104 may include a content metadata service 124, a content queue 126, a content information service 128 and content information storage 130 communicatively coupled through a communication framework 134. The communication framework 134 may be any type of network structure that enables the components of the cloud-based storage service to communicate.

The content metadata service 124 receives requests to publish the content in the cloud-based storage service 104 and to retrieve the content information from the cloud-based storage service 104. The content queue 126 holds the requests to publish the content in the cloud-based storage service. The content information service 128 obtains a request from the content queue and generates the content information. The content information storage 130 stores the content information, content information hash, the location of the content, and other data related to the content.

The content metadata service 124, the content queue 126, the content information service 128, and content information storage 130 may be implemented as one or more computing devices. For example, each of these components may be configured as one or more servers that communicate through a wide area network (WAN).

In various embodiments, the system 100 described herein may comprise a computer-implemented system having multiple elements, programs, procedures, modules, such as without limitation, a mobile device, a personal digital assistant, a mobile computing device, a smart phone, a cellular telephone, a handheld computer, a server, a server array or server farm, a web server, a network server, an Internet server, tablet, a work station, a mini-computer, a mainframe computer, a supercomputer, a network appliance, a web appliance, a distributed computing system, multiprocessor systems, or combination thereof. The elements of the system may be implemented in hardware, a combination of hardware and software, or software. For example, an element may be implemented as a process running on a processor, a hard disk drive, multiple storage drives (of optical and/or magnetic storage medium), an object, an executable, a thread of execution, a program, and/or a computer. One or more elements may reside within a process and/or thread of execution, and an element may be localized on one computer and/or distributed between two or more computers as desired for a given implementation. The embodiments are not limited in this manner.

Attention now turns to a description of embodiments of exemplary methods utilized by system 100. It may be appreciated that the representative methods do not necessarily have to be executed in the order presented, or in any particular order, unless otherwise indicated. Moreover, various activities described with respect to the methods may be executed in serial or parallel fashion, or any combination of serial and parallel operations. The methods may be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 2:
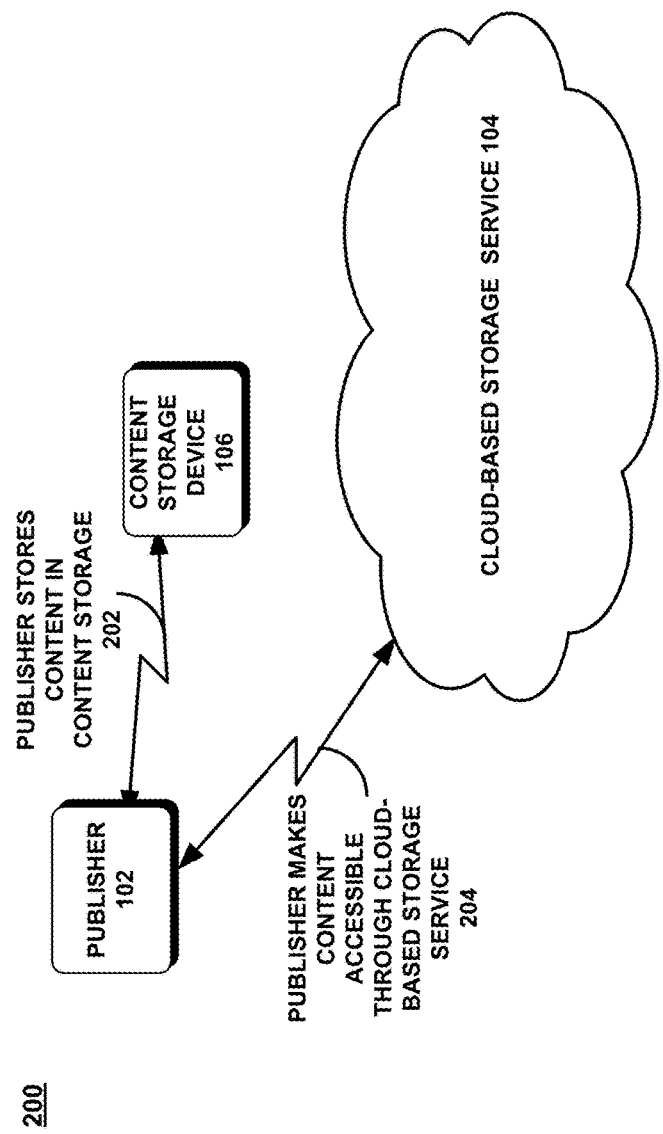
FIG. 2 is a block diagram illustrating publication of content within the cloud-based storage service.

Attention now turns to a method 200 for associating content with the cloud-based storage service 104. Turning to FIG. 2, a publisher 102 may store content in a content storage device 106 that is accessible through the Internet or other publicly accessible networks (line 202). The publisher may intend for the content to be accessible by client machines with a peer-to-peer network through the cloud-based storage service 104. The publisher may then initiate association of the content with the cloud-based storage service 104 (line 204).

Figure 3:
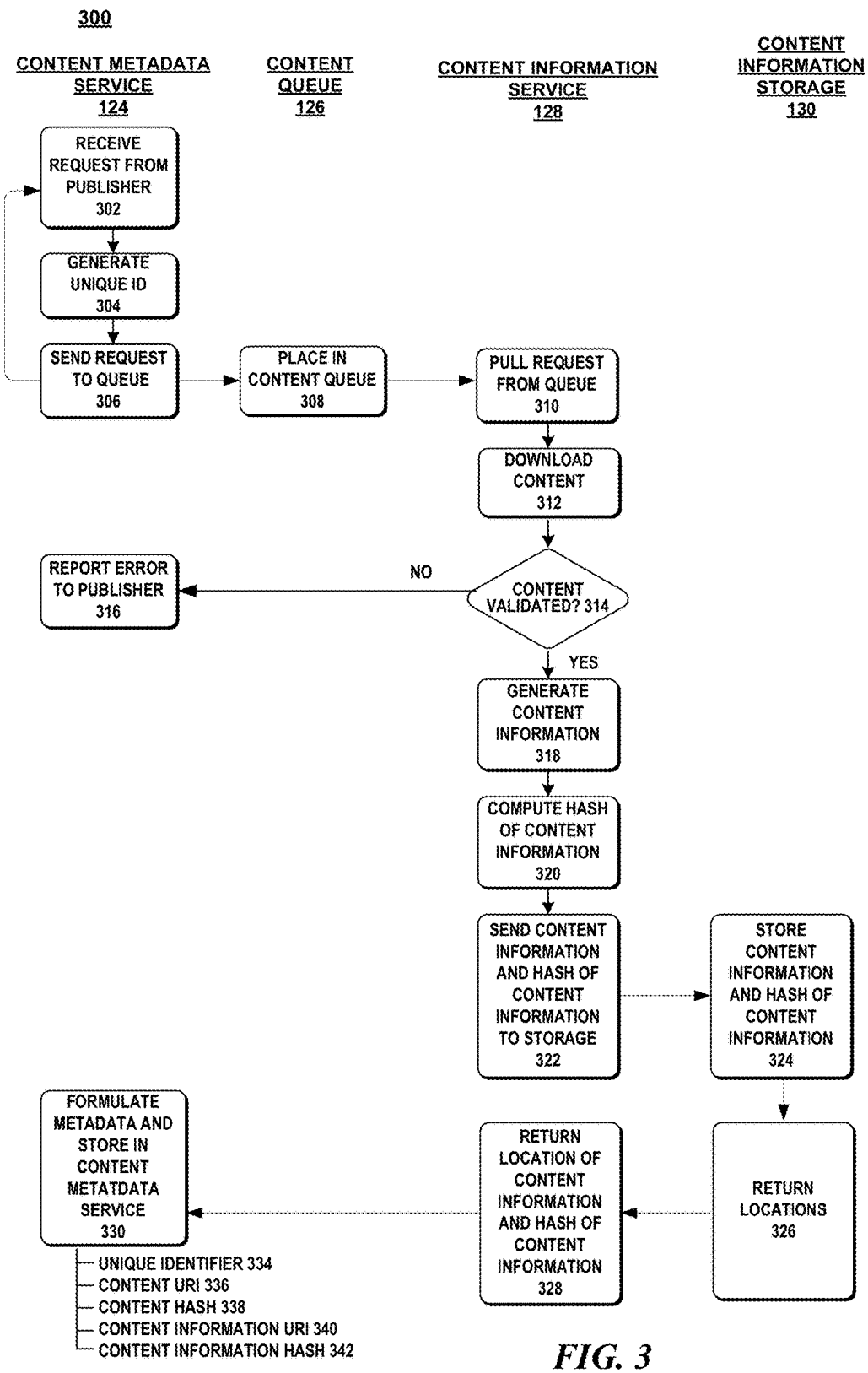
FIG. 3 is a flow diagram illustrating an exemplary method for generating and storing content information and a content information hash in a cloud-based storage service.

Turning to FIG. 3, there is shown in further detail a method 300 for processing a storage request. The content metadata service 124 receives a request from a publisher to associate the content with the cloud-based storage system (block 302). The content metadata service 124 generates a unique identifier (i.e., id) for the request (block 304). The request may include the location of the content information and a content hash. The content hash is used to validate the content. The content metadata service 124 generates a unique identifier for the request which is embodied in the request. The request is then sent to the content queue 126 (block 306) where the request is added to the content queue (block 308).

The content information service 128 pulls the request from the content queue 126 (block 310). The content is obtained or downloaded from the location specified in the request (block 312). The content may be located in any location that is accessible through the World Wide Web. The content is validated by the content hashes provided in the request. A comparison is made between a set of hashes made of the downloaded content with the content hashes provided in the request (block 314). The content information service 128 may utilize a cryptographic hash algorithm or module to generate the set of hashes for the downloaded content. If the comparison does not result in the content being validated (block 314—no), then an error message may be sent to the publisher (block 316).

If the comparison indicates that the content is valid (block 314—yes), then the content information service 128 generates the content information (block 318). The content information consists of hashes that are computed from portions of the original content. The hashes may be based on a SHA-1 or SHA-2 hash of the content. The request may include the block size and segment size used in the hash algorithm.

Next, the content information service 128 generates a set of hashes for the content information (block 320). The hashes of the content information may consist of SHA-1 and SHA-2 hashes of the content information. The content information and the content information hashes are then sent to the content information storage 130 (block 322). The content information storage 130 stores the content information and the content information hash (block 324). The locations of the content information and the content information hash are returned to the content information service 128 (block 326) and then to the content metadata service 124 (block 328).

The content metadata service 124 then constructs the metadata for the content (block 330). The metadata may include the following information: (1) the unique identifier associated with the content 334; (2) the URI of the location of the content 336; (3) the content hash used to validate the content 338; (4) the URI of the content information 340; and (5) content information hash 342 that may be used by the client machine to validate the content information when the content information is downloaded from the content information storage 130. The metadata may then be stored locally within the content metadata service 124 (block 330).

Figure 4:
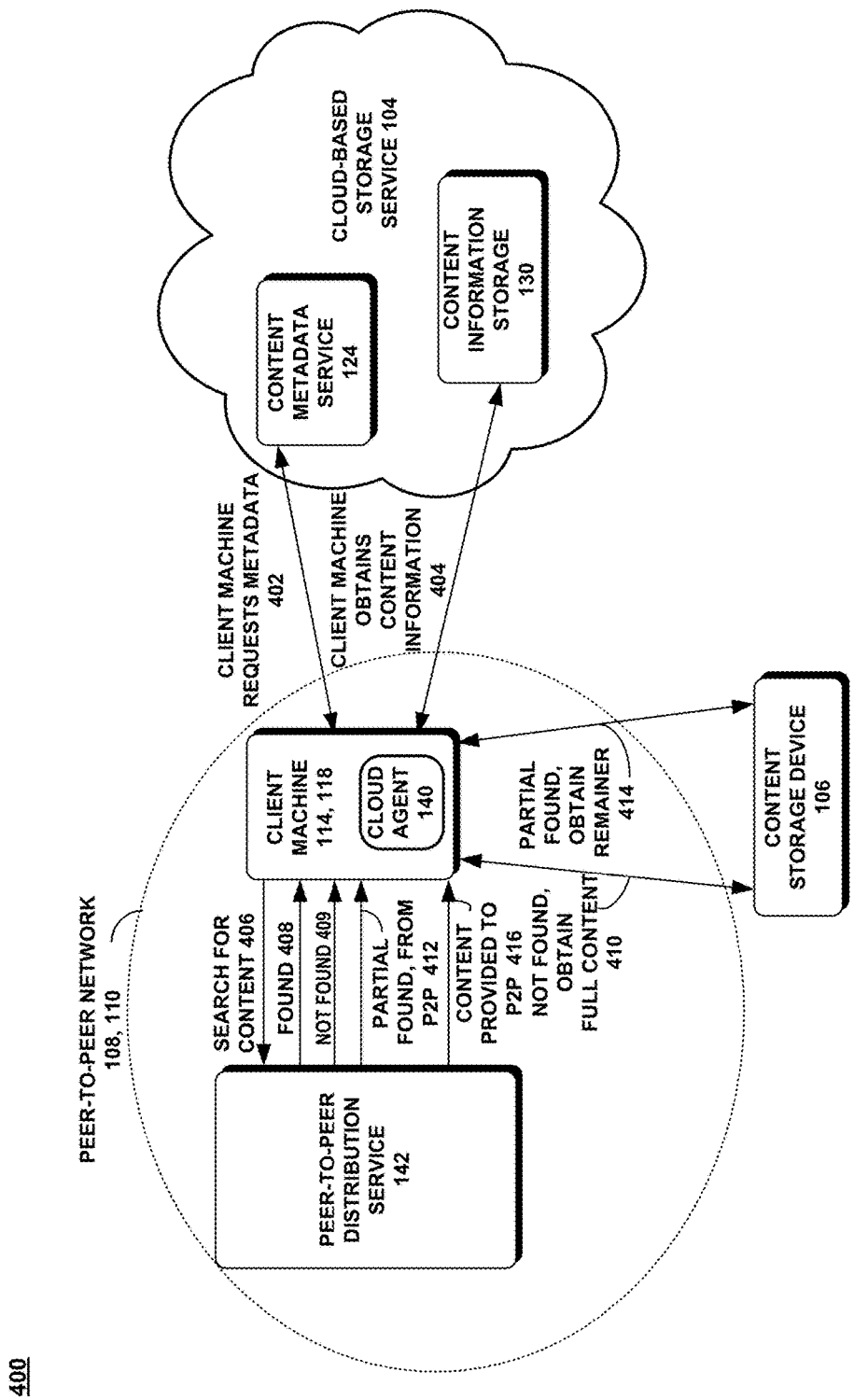
FIG. 4 is a block diagram illustrating access of the content information from a cloud-based storage service.

Attention now turns to a method 400 used by a client machine to obtain content information that is stored in the cloud-based storage service 104. Referring to FIG. 4, a client machine 114, 118, in a peer-to-peer network 108, 110 interacts through a cloud agent 140 to communicate with the cloud-based storage service 104. The cloud agent 140 may be implemented in software as a component, add-on, plug-in, program code, a set of routines, APIs, and so forth. The interactions between the cloud agent 140 and the cloud-based storage service 104 may be through messages transmitted through the Internet using a secure communications protocol, such as a secure sockets layer (SSL), a transport layer security (TLS), and the like.

A client machine may initiate a request for the metadata of the content through the cloud agent 140 (line 402). The client machine may access a web-based user interface to learn of the content accessible in the cloud-based storage service 104. The request may include a unique identifier associated with the content.

The content metadata service 124 returns the metadata to the cloud agent 140. The metadata includes the location of the content information. The cloud agent 140 uses the location of the content information to obtain the content information from the content information storage 130 (line 404). The content information is then used by a peer-to-peer distribution service 142 to search for the content (line 406).

If the content is found in the peer-to-peer network 108, 110, then the content is shared with the client machine 114, 118 (line 408). If the content is not found in the peer-to-peer network 108, 110 (line 409), then the cloud agent 140 obtains the content from the content storage device 106 (line 410). If only a portion of the content is found in the peer-to-peer network, then the portions from the peer-to-peer network are sent to the client machine (line 412). The remaining portions are obtained by the client machine from the content storage device 106 (line 414).

Figure 5:
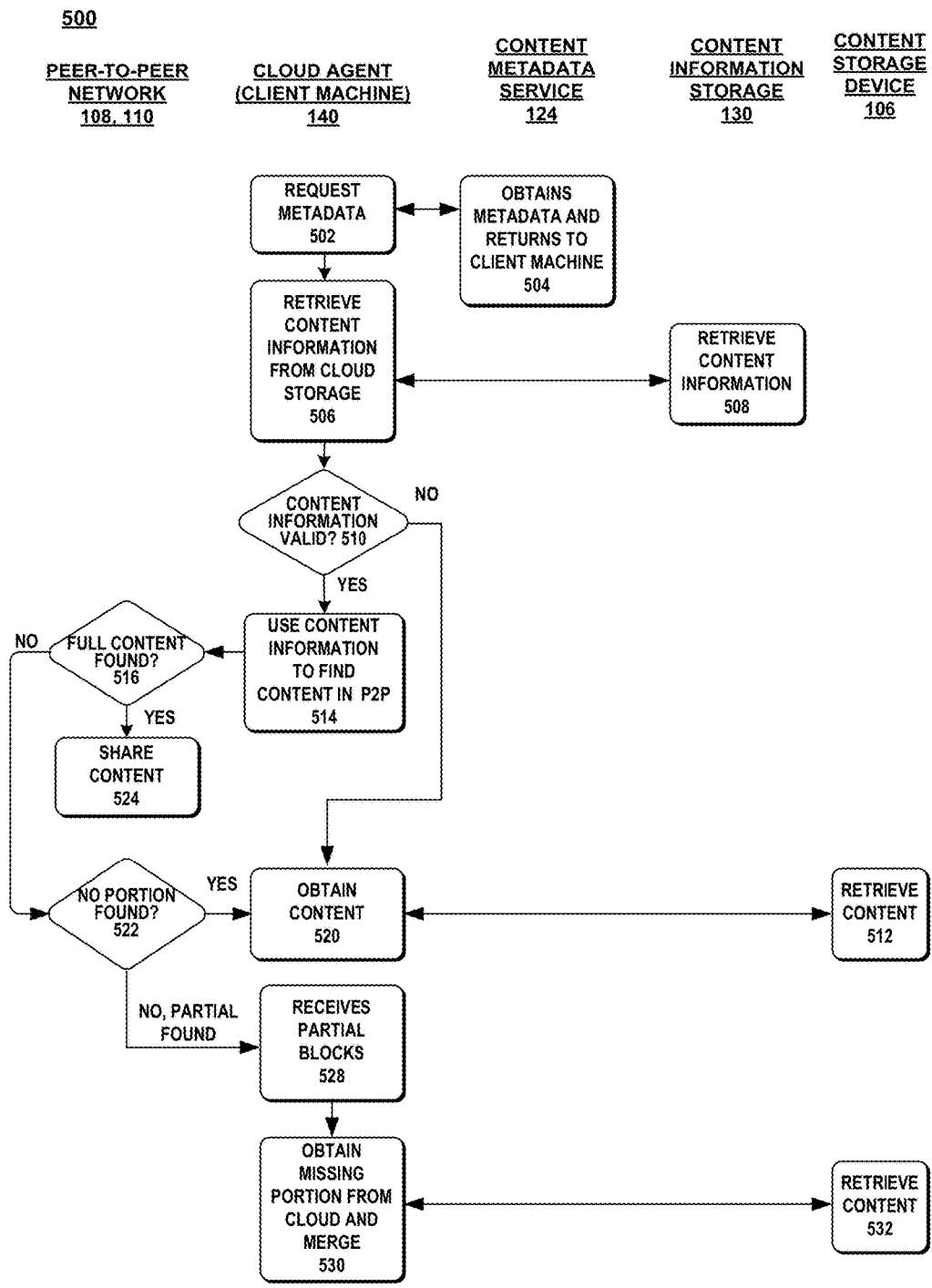
FIG. 5 is a flow diagram illustrating an exemplary method for retrieving content from a cloud-based storage service.

Turning to FIG. 5, there is shown in further detail a method 500 of retrieving content information from the cloud-based storage service 104. A request for content starts with a cloud agent 140 in a client machine 114, 118 requesting metadata associated with the content (block 502). The content metadata service 124 obtains the metadata and returns the metadata to the cloud agent 140 in the requesting client machine 114, 118 (block 504).

The metadata includes the location of the content information, content hashes, content information hash, and other data. The cloud agent 140 then uses the location of the content information to retrieve the content information from content information storage 130 (blocks 506, 508). Once the cloud agent 140 retrieves the content information, the cloud agent 140 validates the content information using the content information hash from the metadata (block 510).

If a comparison of the content information hash and a hash of the downloaded content information is not the same, then the content information is not valid (block 510—no) and the cloud agent 140 retrieves the content directly from the content storage device that contains the content (blocks 520, 512).

If a comparison of the content information hash and a hash of the downloaded content information is the same, then the content information is valid (block 510—yes). The content information may then be used to request the content from the peer-to-peer network (P2P) (block 514). If the full content is not found within the peer-to-peer network 108, 110 (block 516—no, block 522—yes), then the content is retrieved from the content storage device 106 that stores the content (blocks 520, 512). If the content is found within the peer-to-peer network 108, 110 (block 516—yes), then the content is shared with the client machine (block 524).

Sometimes a portion of the content may be found in the peer-to-peer network (block 522—no). A client machine in the peer-to-peer network may inadvertently delete or destroy portions of the local copy of the content. In this case, the found blocks of the content are sent to the cloud agent 140 (block 528) and the cloud agent 140 obtains the missing blocks from the content storage device 106 (blocks 530, 532). The missing blocks are streamed to the cloud agent (block 532) while the cloud agent merges the blocks and validates the blocks as they arrive (block 530). The streaming of the content enables the cloud agent to process the content as the content is received without waiting for completion of the entire transmission.

It should be noted that FIGS. 2-5 illustrate flow diagrams of exemplary methods. However, the methods illustrated in these figures may be representative of some or all of the operations executed by one or more embodiments described herein and that the methods can include more or less operations than that which is described in FIGS. 2-5.

Figure 6:
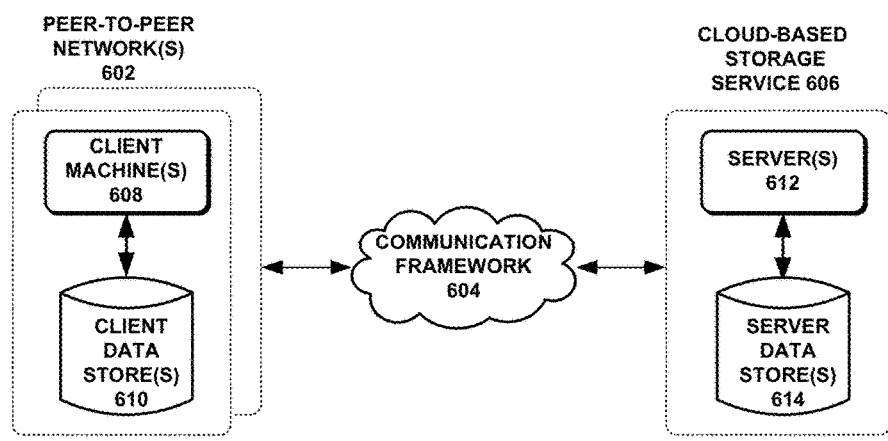
FIG. 6 is a block diagram illustrating an exemplary operating environment.

Attention now turns to a discussion of an exemplary operating environment. Referring now to FIG. 6, there is shown a schematic block diagram of an exemplary operating environment 600. It should be noted that the operating environment 600 is exemplary and is not intended to suggest any limitation as to the functionality of the embodiments.

The embodiments may be applied to an operating environment 600 having one or more peer-to-peer networks 602 in communication through a communications framework 604 with a cloud-based storage service 606. Each peer-to-peer network 602 may include one or more client machines 608 communicatively coupled to one or more client data stores 610. Each client machine 608 within a peer-to-peer network 602 may be coupled to other client machines 608 through a communication link, such as a LAN.

A client machine 608 may be embodied as a hardware device, a software module, or a combination thereof. The client 608 may be any type of electronic device, such as, without limitation, a mobile device, a personal digital assistant, a mobile computing device, a smart phone, a cellular telephone, tablet, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The client 608 may also be embodied as a software module having instructions that execute in a single execution path, multiple concurrent execution paths (e.g., thread, process, etc.), or in any other manner.

A cloud-based storage service 606 may include one or more servers 612 communicatively coupled to one or more server data stores 614. Each server 612 may be communicatively coupled to other servers through any type of communication interconnect, such as a LAN, WAN, and so forth. A server 612 may be embodied as a hardware device, a software module, or as a combination thereof. The server 612 may be any type of electronic device capable of executing programmable instructions such as, without limitation, a mobile device, a personal digital assistant, a mobile computing device, tablet, a smart phone, a cellular telephone, a handheld computer, a server, a server array or server farm, a blade server, a web server, a network server, an Internet server, a work station, a mini-computer, a mainframe computer, a supercomputer, a network appliance, a web appliance, a distributed computing system, multiprocessor systems, or combination thereof. The server 612 may also be embodied as a software module having instructions that execute in a single execution path, multiple concurrent execution paths (e.g., thread, process, etc.), or in any other manner.

The communications framework 604 facilitates communications between the client machines 608 in the peer-to-peer networks 602 and the servers 612 in the cloud-based storage service 606. The communications framework 604 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators).

A client machine 608 and a server 612 may include various types of standard communication elements designed to be interoperable with the communications framework 604, such as one or more communications interfaces, network interfaces, network interface cards, radios, wireless transmitters/receivers, wired and/or wireless communication media, physical connectors, and so forth. Examples of wired communications media may include a wire, cable, metal leads, printed circuit boards, backplanes, switch fabrics, semiconductor material, twisted-pair wire, coaxial cable, fiber optics, a propagated signal, and so forth. Examples of wireless communications media may include acoustic, radio frequency spectrum, infrared, and other wireless media.

Figure 7:
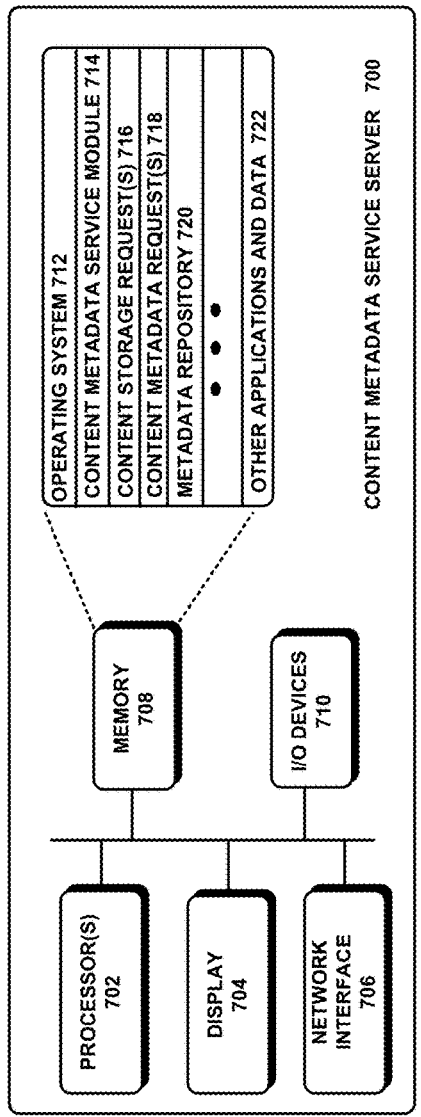
FIG. 7 is a block diagram illustrating an exemplary content metadata service server.

FIG. 7 illustrates a computing device implementing a content metadata service server 700. The content metadata service server 700 may have one or more processors 702, a display 704, a network interface 706, a memory 708, and I/O devices 710. A processor 702 may be any commercially available processor and may include dual microprocessors and multi-processor architectures. The display 704 may be any visual display unit and it may be embedded within a computing device or physically separated from it. The network interface 706 facilitates wired or wireless communications between the content metadata service server 700 and a communications framework.

The memory 708 may be any computer-readable storage media that may store executable procedures, applications, and data. It may be any type of computer-readable memory device such as random access memory, read-only memory, magnetic storage, volatile storage, non-volatile storage, optical storage, DVD, CD, floppy disk drive, and the like. The computer-readable storage media does not pertain to propagated signals, such as modulated data signals transmitted through a carrier wave. The memory 708 may also include one or more external storage devices or remotely located storage devices. The memory 708 may contain instructions and data as follows:
- an operating system 712;
- a content metadata service module 714, having processor-executable instructions, that perform the tasks of the content metadata service 124;
- one or more content storage requests 716;
- one or more content metadata requests 718;
- a metadata repository 720; and
- various other applications and data 722.

Figure 8:
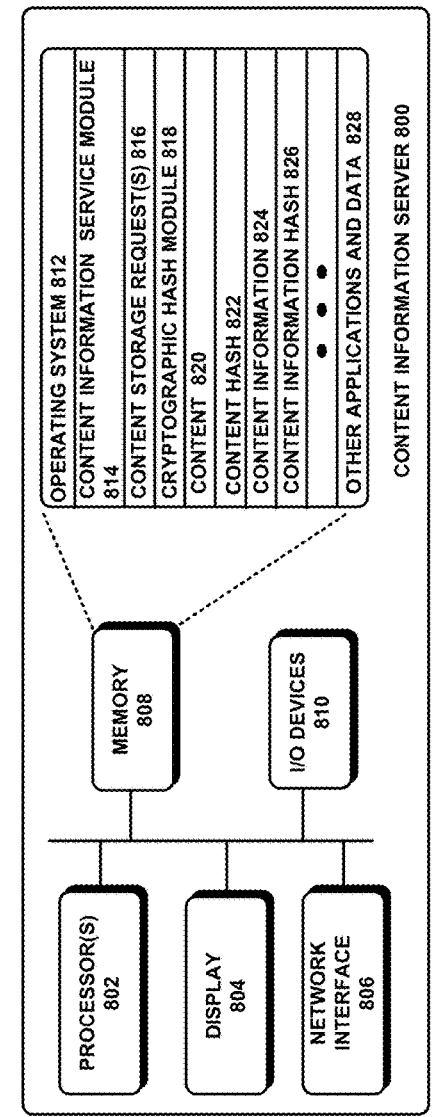
FIG. 8 is a block diagram illustrating an exemplary content information service server.

FIG. 8 illustrates a computing device implementing a content information service server 800. The content information service server 800 may have one or more processors 802, a display 804, a network interface 806, a memory 808, and I/O devices 810. A processor 802 may be any commercially available processor and may include dual microprocessors and multi-processor architectures. The display 804 may be any visual display unit and it may be embedded within a computing device or physically separated from it. The network interface 806 facilitates wired or wireless communications between the content information service server 800 and a communications framework.

The memory 808 may be any computer-readable storage media that may store executable procedures, applications, and data. It may be any type of computer-readable memory device, such as random access memory, read-only memory, magnetic storage, volatile storage, non-volatile storage, optical storage, DVD, CD, floppy disk drive, and the like. The computer-readable storage media does not pertain to propagated signals, such as modulated data signals transmitted through a carrier wave. The memory 808 may also include one or more external storage devices or remotely located storage devices. The memory 808 may contain instructions and data as follows:
- an operating system 812;
- a content information service module 814, having processor-executable instructions, that perform the tasks of the content information service 128;
- one or more content storage requests 816;
- a cryptographic hash module 818 that may be used to generate hash values for content and content information, and so forth;
- content 820;
- a content hash 822;
- content information 824;
- content information hash 826; and
- various other applications and data 828.

Figure 9:
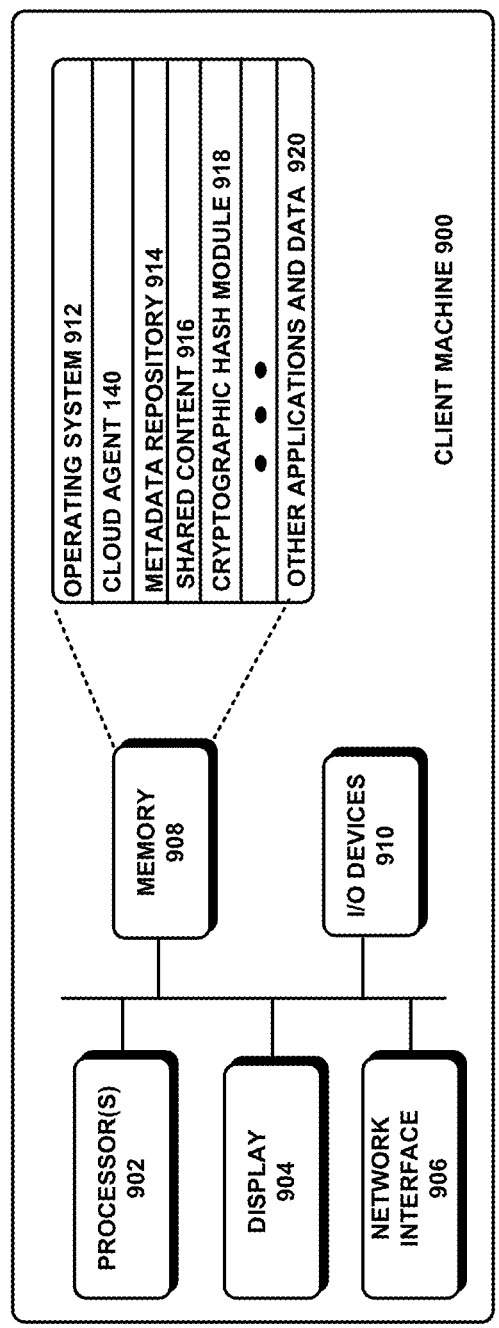
FIG. 9 is a block diagram illustrating an exemplary client machine.

FIG. 9 illustrates a computing device implementing a client machine 900. The client machine 900 may have one or more processors 902, a display 904, a network interface 906, a memory 908, and I/O devices 910. A processor 902 may be any commercially available processor and may include dual microprocessors and multi-processor architectures. The display 904 may be any visual display unit and it may be embedded within a computing device or physically separated from it. The network interface 906 facilitates wired or wireless communications between the client machine 900 and a communications framework.

The memory 908 may be any computer-readable storage media that may store executable procedures, applications, and data. It may be any type of computer-readable memory device, such as random access memory, read-only memory, magnetic storage, volatile storage, non-volatile storage, optical storage, DVD, CD, floppy disk drive, and the like. The computer-readable storage media does not pertain to propagated signals, such as modulated data signals transmitted through a carrier wave. The memory 908 may also include one or more external storage devices or remotely located storage devices. The memory 908 may contain instructions and data as follows:
- an operating system 912;
- a cloud agent 140, having processor-executable instructions, that performs that operations as described herein;
- a repository of metadata 914, the metadata used to access content in the cloud-based storage service;
- shared content 916 that is shared with other client machines in a peer-to-peer network;
- a cryptographic hash module 918; and
- various other applications and data 920.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A system, comprising:
at least one processor and a memory;
the at least one processor configured to:
   obtain content information associated with a content file, the content file including a plurality of portions of content, the content information comprising one or more hash values that represent a compacted form of one or more portions of the plurality of portions of content;

search for the content information in a peer-to-peer network;

obtain one or more portions of the plurality of portions of the content that match the content information from the peer-to-peer network;

obtain at least one remaining portion of the one or more portions of the plurality of portions of the content from a first remote storage device; and merge the one or more portions of the plurality of portions of the content obtained from the content information found in the peer-to-peer network with the at least one remaining portion to construct a merged content file.

2. The system of claim 1, wherein the at least one processor is further configured to:

obtain one or more content information hashes; and use the one or more content information hashes to validate the obtained content information.

3. The system of claim 2, wherein the at least one processor is further configured to: in response to a request for metadata associated with the content file, receive the one or more content information hashes.

4. The system of claim 1, wherein the at least one processor is further configured to:

obtain a location of the content information in a cloud-based storage service; and use the location of the content information to obtain one or more portions of the content information from the cloud-based storage service.

5. The system of claim 4, wherein the at least one processor is further configured to: in response to a request for metadata associated with the content file, receive the content information associated with the content file.

6. The system of claim 1, wherein the at least one processor is further configured to: in response to a request for metadata associated with the content file, receive a location of the content in a first remote storage device.

7. The system of claim 1, wherein the at least one processor is configured to: host the merged content file for devices connected to the peer-to-peer network.

8. The system of claim 1, wherein the at least one processor is further configured to: in response to a request for metadata associated with the content file, receive content hashes for use in validating the plurality of portions of content.

9. The system of claim 8, wherein the at least one processor is further configured to: merge the one or more portions of the plurality of portions of content from the peer-to-peer network with the at least one remaining portion while validating the at least one remaining portion with the content hashes.

10. A device, comprising:

at least one processor and a memory;

wherein the at least one processor is configured to:

obtain a plurality of hashes representing a compacted form of one or more portions of a content file;

search for at least one of the plurality of hashes in one or more other devices of a peer-to-peer network;

obtain portions of the content file that are associated with the at least one of the plurality of hashes from the one or more of the other devices of the peer-to-peer network;

obtain at least one remaining portion of the plurality of hashes from a remote storage device; and construct the content file on the device using portions of the content file obtained from the one or more other devices of the peer-to-peer network and the remote storage device.

11. The device of claim 10, wherein the at least one processor is further configured to:

obtain the plurality of hashes from a cloud-based storage service.

12. The device of claim 10, wherein the content file includes at least one segment having at least one block, wherein the plurality of hashes includes at least one segment hash used to validate the at least one segment and at least one block hash used to validate the at least one block.

13. The device of claim 10, wherein the at least one processor is further configured to:

distribute one or more portions of the content file to other devices in the peer-to-peer network.

14. The device of claim 10, wherein the at least one processor is further configured to:

obtain a location of the plurality of hashes in a cloud-based storage service; and use the location to obtain the plurality of hashes.

15. A method, comprising:

obtaining, at a device having at least one processor and a memory, content information associated with a content file, the content file including a plurality of portions of content, the content information comprising one or more hash values that represent a compacted form of one or more portions of the plurality of portions of content;

searching for the content information in a peer-to-peer network;

obtaining one or more portions of the plurality of portions of the content that match the content information from the peer-to-peer network;

obtaining at least one remaining portion of the one or more portions of the plurality of portions of the content from a first remote storage device; and merging the one or more portions of the plurality of portions of the content obtained from the content information found in the peer-to-peer network with the at least one remaining portion to construct a merged content file.

16. The method of claim 15, further comprising:

obtaining one or more content information hashes; and using the one or more content information hashes to validate the obtained content information.

17. The method of claim 16, further comprising:

in response to a request for metadata associated with the content file, receiving the one or more content information hashes.

18. The method of claim 15, further comprising:

obtaining a location of the content information in a cloud-based storage service; and using the location of the content information to obtain one or more portions of the content information from the cloud-based storage service.

19. The method of claim 15, further comprising:

hosting the merged content file for devices connected to the peer-to-peer network.

20. The method of claim 15, further comprising:

merging the one or more portions of the plurality of portions of content from the peer-to-peer network with the at least one remaining portion while validating the at least one remaining portion with the content hashes.

* * * * *